(12) United States Patent
Misulia et al.

(10) Patent No.: US 12,717,053 B2
(45) Date of Patent: Aug. 25, 2026

(54) ACOUSTIC SYSTEM WITH INCREASED SENSITIVITY

(71) Applicant: Raytheon Company, Arlington, VA (US)

(72) Inventors: Joseph M. Misulia, Attleboro, MA (US); Robert C. Haberman, Mystic, CT (US)

(73) Assignee: Raytheon Company, Arlington, VA (US)

( * ) Notice: Subject to any disclaimer, the term of this patent is extended or adjusted under 35 U.S.C. 154(b) by 217 days.

(21) Appl. No.: 18/500,348

(22) Filed: Nov. 2, 2023

(65) Prior Publication Data

US 2024/0159929 A1 May 16, 2024

Related U.S. Application Data

(60) Provisional application No. 63/383,539, filed on Nov. 14, 2022.

(51) Int. Cl.
*G01V 1/18* (2006.01)
*G01H 11/08* (2006.01)

(52) U.S. Cl.
CPC ............. *G01V 1/186* (2013.01); *G01H 11/08* (2013.01); *G01V 2210/1423* (2013.01)

(58) Field of Classification Search
CPC . G01V 1/186; G01V 2210/1423; G01H 11/08
See application file for complete search history.

(56) References Cited

U.S. PATENT DOCUMENTS 4,300,218 A 11/1981 Kruka et al.
4,998,226 A 3/1991 Henning et al.
5,412,621 A * 5/1995 Hepp ...................... H04R 1/44 367/20
6,188,646 B1 2/2001 Luscombe et al.
(Continued)

FOREIGN PATENT DOCUMENTS

CN 111142153 5/2020
CN 111142153 A * 5/2020 ........... G01V 1/3808
WO 2018041855 3/2018

OTHER PUBLICATIONS

"International Application Serial No. PCT US2023 078443, International Search Report mailed Feb. 7, 2024", 5 pgs.
(Continued)

*Primary Examiner* — Abdallah Abulaban
(74) *Attorney, Agent, or Firm* — Schwegman Lundberg & Woessner, P.A.

(57) ABSTRACT

An acoustic system and method of fabricating the acoustic system, wherein the acoustic system comprises at least one tube having at least one opening through which an acoustic wave travels to increase sensitivity of the acoustic system and at least one hydrophone in the at least one tube, wherein the at least one hydrophone is encapsulated and the method comprises inserting at least one encapsulated hydrophone in at least one tube with at least one opening through which an acoustic wave travels to increase sensitivity of the at least one hydrophone, inserting the at least one tube into a fluid, and receiving the acoustic wave through the fluid by the at least one hydrophone.

22 Claims, 8 Drawing Sheets

(56) References Cited

U.S. PATENT DOCUMENTS

2019/0137637 A1* 5/2019 Griffin ...................... G01S 5/22

OTHER PUBLICATIONS

"International Application Serial No. PCT US2023 078443, Written Opinion mailed Feb. 7, 2024", 5 pgs.

"European Application Serial No. 23814067.7, Response to Communication pursuant to Rules 1612 and 162 EPC filed Dec. 10, 2025", 34 pgs.

"European Application Serial No. 23814067.7, Communication Pursuant to Article 943 EPC mailed Mar. 4, 2026", 5 pgs.

* cited by examiner

ACOUSTIC SYSTEM WITH INCREASED SENSITIVITY

CROSS REFERENCE TO RELATED APPLICATIONS

The present application claims benefit of U.S. Provisional Patent Application No. 63/383,539, filed on Nov. 14, 2022, which is incorporated herein by reference.

BACKGROUND

In undersea sensing and sound navigation and ranging (SONAR) applications, it is often advantageous to deploy volumetric arrays of various shapes. These array design schemes require that sensors be held in specific, precise locations relative to each other to form a volumetric array within the water column.

Fixturing or positioning sensing elements using mechanical structure is often challenging. Installing sensitive transducers into large and/or stiff structures often introduces unwanted mechanical noise or destructive acoustic interference relative to the propagating sound waves of interest as support structure resonant modes are excited. Furthermore, undersea systems are size, weight, and power (SWAP) constrained, which makes for a challenging design space.

Often times acoustic designers must accept and design around a sensor sensitivity decrease or structure interferences in order to accommodate the structure needed to form an underwater volumetric array.

SUMMARY

In accordance with the concepts described herein, exemplary acoustic systems and methods enable fixturing an underwater acoustic sensor that achieves a passive increase in sensitivity in lieu of a decrease or some known inference.

In accordance with the concepts described herein, an exemplary acoustic system is constructed using composite materials which are strong and have a high specific stiffness, where the composite materials have no risk of corrosion during long undersea deployments.

In accordance with the concepts described herein, an exemplary acoustic system and method provide a passive sensor sensitivity increase on an order of 3 dB depending on system configuration.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 4 is an illustration of exemplary shapes of an end of a tube of the present disclosure;

DETAILED DESCRIPTION

Deployment of a volumetric array is challenging from a mechanical perspective. The present disclosure provides a system and method of holding an array shape and sensor location relative to each other known for all cross flow conditions. The present disclosure also provides example systems and methods for holding sensors in known locations relative to each other without introducing a structural destructive interference. The present disclosure also provides a system that is lightweight, stiff, strong, will not corrode during long seaborn deployment, and may be tuned to achieve amplification in a band of interest only.

Figure 1A:
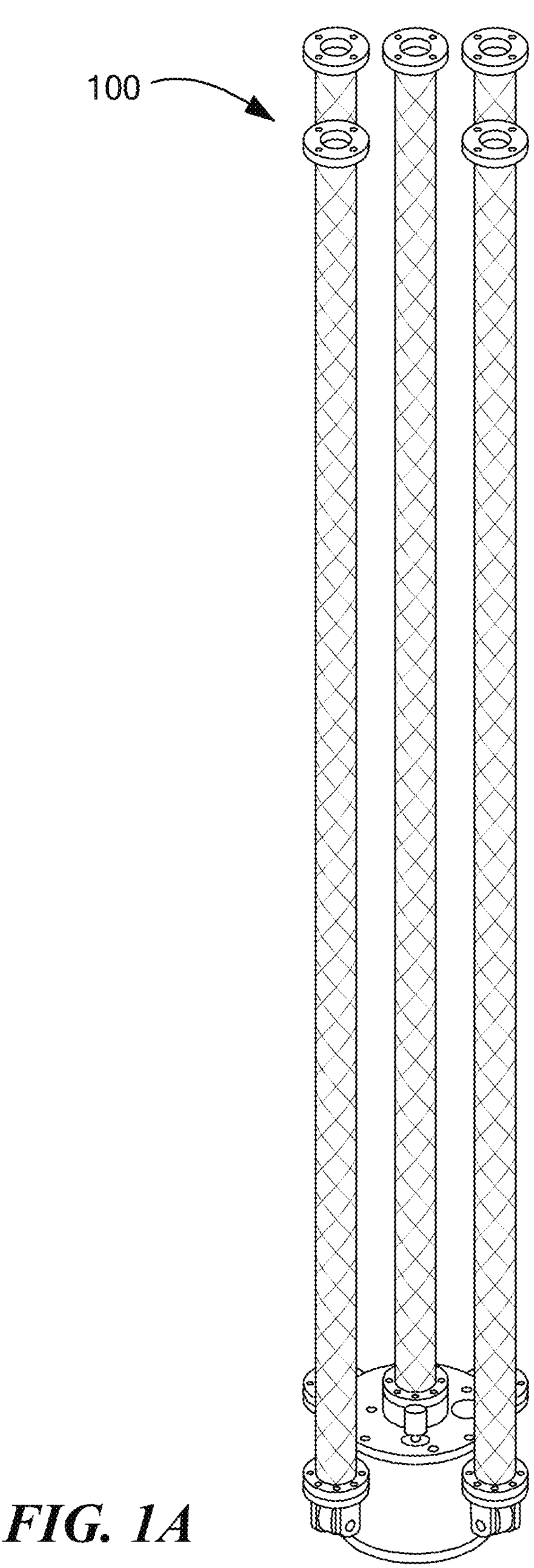
FIGS. 1A and 1B are illustrations of an exemplary acoustic system of the present disclosure.
Figure 1B:
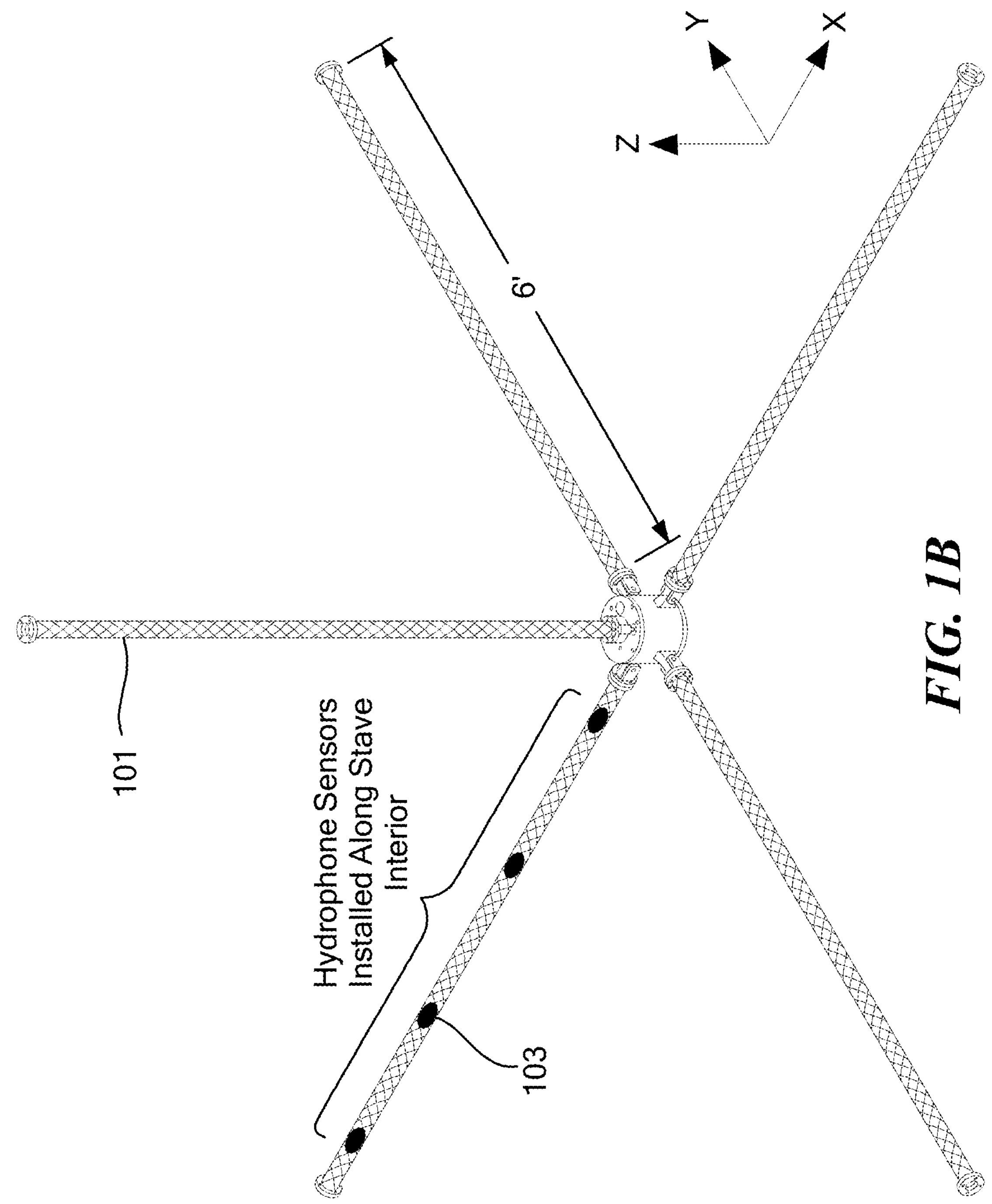

FIGS. 1A and 1B are illustrations of an exemplary acoustic system 100 with increased sensitivity. FIG. 1A shows the acoustic system 100 in an example stowed configuration and FIG. 1B shows the acoustic system in an example deployed configuration. In the exemplary embodiment, the acoustic system 100 comprises at least one tube 101 containing at least one hydrophone 103, where the at least one tube 101 has at least one opening to allow an acoustic wave to be received by the at least one hydrophone 103.

FIGS. 1A and 1B illustrate four 6 foot long foldable tubes 101 containing hydrophones 103 in an X-axis and a Y-axis in stowed state (FIG. 1A) and a deployed state (FIG. 1B), where one tube 101 without a hydrophone 103 therein is used to position the four foldable tubes along a Z-axis. However, the present disclosure is not intended to be limited thereto. In alternate embodiments, the acoustic system 100 may include one tube 101 containing at least one hydrophone 103 in only an X-axis, only a Y-axis, and only a Z-axis; four tubes 101 each containing at least one hydrophone 103 in any two axes (e.g., X-axis and Y-axis, X-axis and Z-axis, and Y-axis and Z-axis); and five tubes 101 each containing at least one hydrophone 103 in all three axes (e.g., X-axis, Y-axis, and Z-axis). The tube 101 may be short enough (e.g., greater than or equal to 1 inch) to accommodate as few as one hydrophone 103 or many feet long (e.g., greater than or equal to 1 foot) to accommodate any user-definable number of hydrophones 103.

A tube 101 containing a hydrophone 103 includes at least one opening in the tube 101 to allow an acoustic wave to be received by the hydrophone 103. The least one opening may be along the length of the tube 101, at one end of the tube 101, at both ends of the tube 101, coincident with the hydrophone 103, not coincident with the hydrophone 103, or any combination thereof. In example embodiments, the openings in the tube 101 allow a fluid, such as seawater to freely flow through the tube 101 and around the hydrophones 103.

The tube 101 is constructed from materials that may be strong, stiff, and resistant to corrosion (e.g., composite materials, metals, plastic, etc.). Composite materials comprise fiberglass, carbon fiber, and epoxy. Example metals comprise brass, bronze, stainless steel, titanium, aluminum, nickel, gold, and so on. In example embodiments, the acoustic system is configured for immersion in fluids comprising Newtonian fluids (e.g., seawater, freshwater, etc.). In other embodiments, the acoustic system is configured for immersion in non-Newtonian fluids (e.g., paint, starch suspensions, etc.).

The tube 101 increases hydrophone 103 sensitivity when compared to a hydrophone 103 alone in a fluid. Resonant frequencies are excited in the tube 101 by an acoustic wave (e.g., a soundwave) impinging on the tube 101. Coupling of tube 101 to the hydrophone 103 via a fluid allows for passive amplification of a pressure wave caused by an acoustic wave on the active surface of the hydrophone 103. Sensitivity of the hydrophone 103 may depend upon location of the hydrophone 103 within the tube 101.

Tube 101 and hydrophone 103 geometry may influence the sensitivity of the hydrophone 103. A gap between an exterior surface of the hydrophone 103, including the encapsulant of the hydrophone 103 described below in greater detail with reference to FIG. 2, to an inner surface of the tube 101 as measured by a ratio of the inner diameter of the tube 101 divided by the outer diameter on the hydrophone 103 may be any value from slight (e.g., 1.1) to great (e.g., greater than 100).

There is a correlation between hydrophone 103 size and a frequency at which the sensitivity of the hydrophone 103 is maximal. Smaller hydrophones 103 exhibit increased sensitivity at higher frequencies. Increased fluid movement, caused by an acoustic wave, between a hydrophone 103 and a tube 101 increases hydrophone 103 sensitivity. The length of the tube 101 affects hydrophone 103 sensitivity (e.g., the longer the tube 101 the greater the hydrophone 103 sensitivity).

Figure 2:
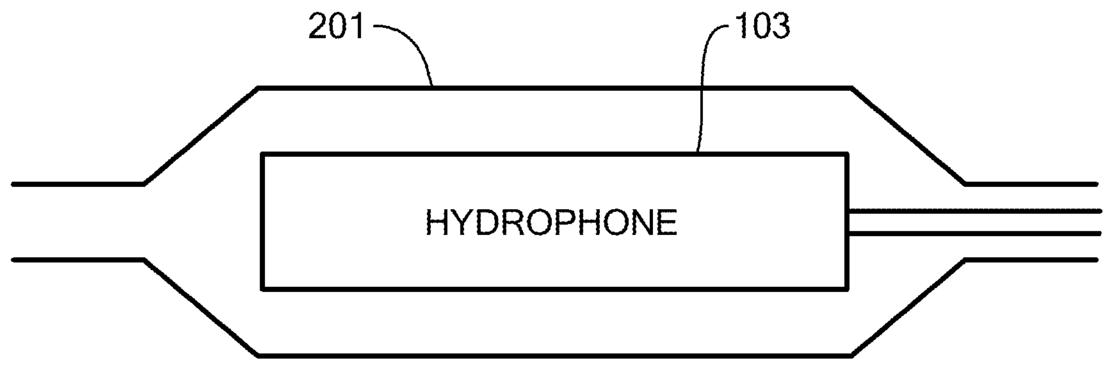
FIG. 2 is an illustration of an exemplary encapsulated hydrophone of FIG. 1.

FIG. 2 is an illustration of an exemplary encapsulated hydrophone 103 in FIG. 1. In an exemplary embodiment, the hydrophone 103 is a passive hydrophone 103 (e.g., not requiring a power supply) and includes two electrodes. In an exemplary embodiment, the hydrophone 103 is a piezoelectric device. In an embodiment where more than one hydrophone 103 is included in a tube 101, the hydrophones 103 may be connected in series or in parallel. In addition, each hydrophone 103 is encapsulated in a material 201 (e.g., polyurethane) that is impervious to the fluid in which the hydrophone 103 is placed.

Figures 3A, 3B:
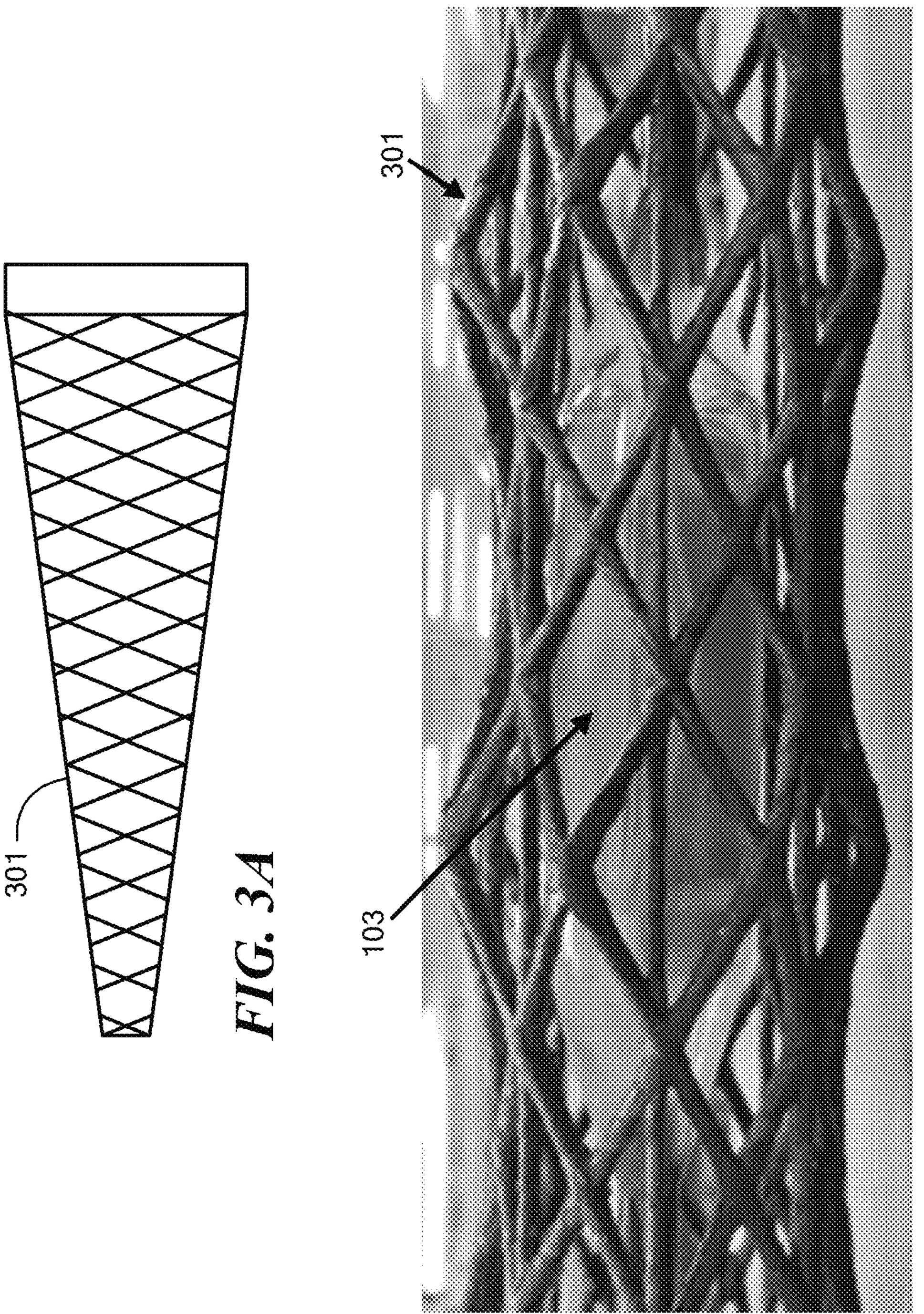
FIG. 3A is an illustration of an exemplary tapered isometric mesh tube of the present disclosure.
FIG. 3B is a photograph of an exemplary isometric mesh tube with an encapsulated hydrophone inserted therein.

FIG. 3A is an illustration of an exemplary tapered isometric mesh tube 301 of the present disclosure. In an alternate embodiment, the tube 101 in FIG. 1 may comprise the tapered tube 301 of FIG. 3A, where the tube 301 has a lattice structure, where the lattice provides stiffness and strength while including a plurality of openings in the tube 301. The lattice structure of the tube 301 is commonly referred to as an isometric mesh (iso mesh) or isometric grid (iso grid). The tapered iso mesh tube 301 may be constructed out of the same materials identified above with respect to the tube 101 of FIG. 1. In an alternate embodiment, the tapered lattice tube 301 may not be tapered.

FIG. 3B is a photograph of an exemplary isometric mesh tube 301 with an encapsulated hydrophone 103 inserted therein. In the illustrated embodiment, the mesh includes a series of helical windings having a lattice configuration that wind around the hydrophones. In some embodiments, the winding spacing is fixed. In other embodiments winding spacing may vary over length and vary in shape (e.g., openings formed by the winding may be in the shape of a circle, a square, a polygon, etc. as illustrated in FIG. 4 described below. Open areas of the tube 301 allow an acoustic wave to enter the tube 301 and apply pressure on the hydrophone 103. Without openings in a tube, a pressure spectrum as seen by a hydrophone in the tube is significantly altered, as compared to that of a tube with openings, as to make signal processing useless.

FIG. 4 is an illustration of exemplary shapes of both an end of a tube 101/301 and an opening along the length of the tube 101/301 of the present disclosure. In an exemplary embodiment, a shape of an end of the tube 101/301 and an opening along the length of the tube 101/301 may be a circle 401, a square 403, or a polygon 405.

Figure 5:
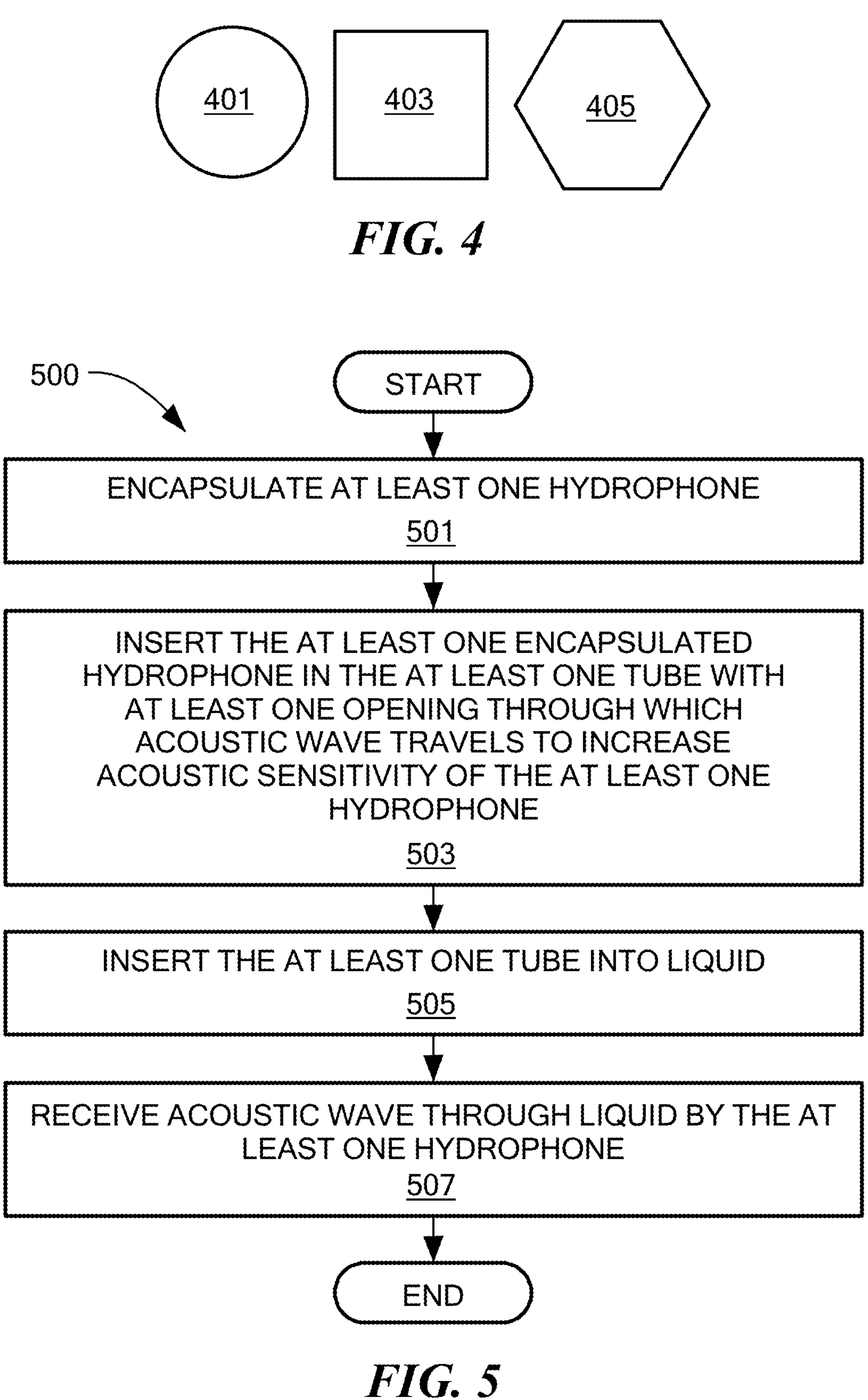
FIG. 5 is an exemplary method of an acoustic system with increased sensitivity of the present disclosure.

FIG. 5 is an exemplary method 500 of an acoustic system with increased sensitivity of the present disclosure. The exemplary method 500 comprises encapsulating at least one hydrophone in step 501. In an exemplary embodiment, the at least one hydrophone may be a piezoelectric device and the encapsulant (e.g., polyurethane) may be impervious to a Newtonian fluid (e.g., seawater, fresh water, etc.) and a non-Newtonian fluid.

Step 503 of the method 500 comprises inserting the at least one encapsulated hydrophone in at least one tube having at least one opening through which an acoustic wave travels to increase sensitivity of the at least one hydrophone. In an embodiment, the tube may be made from a composite material, a metal, or a plastic as described above. In addition, the tube may be tapered or not, include an iso mesh, and have an end shape that is a circle, a square, or a polygon. In an exemplary embodiment, a space exists between an external surface of each encapsulated hydrophone and the internal surface of the tube in which the hydrophone is inserted, where the space may be as described above.

Step 505 comprises inserting the at least one tube into a fluid. In an exemplary embodiment, each tube that is inserted in the fluid may be oriented along on of three axes (e.g., x-axis, y-axis, or z-axis) to a user-definable depth. In addition, the fluid may be a Newtonian fluid or a non-Newtonian fluid as described above.

Step 507 comprises receiving an acoustic wave through the fluid by the at least one hydrophone.

Figure 6:
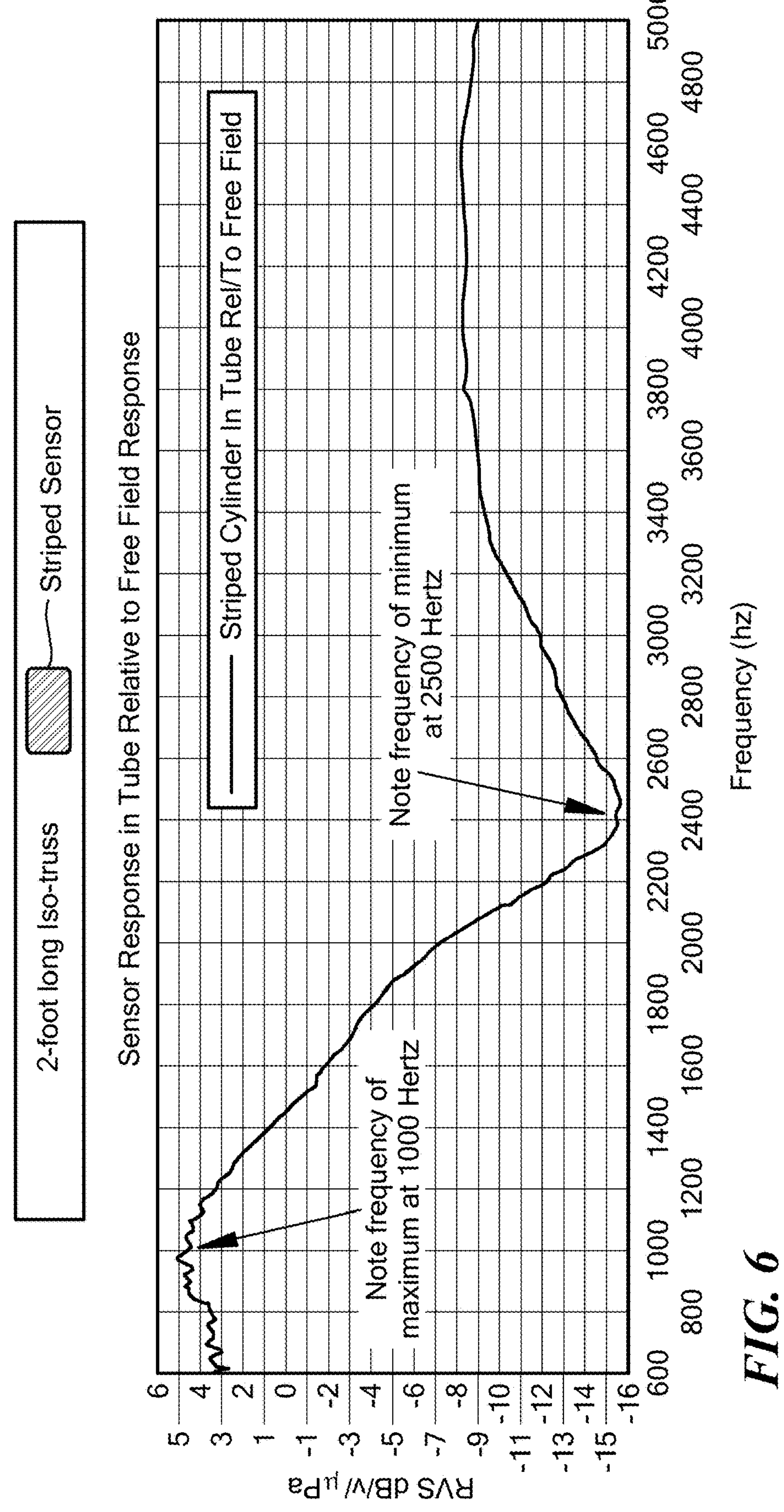
FIG. 6 is graphical representation of response for an example sensor in accordance with example embodiments of the disclosure.

FIG. 6 is graphical representation of an example sensor response relative to free field response for an illustrative sensor within a 2-foot long iso-truss. As can be seen, the response has a frequency maximum at 1000 Hertz and a frequency minimum at 2500 Hertz.

Figure 7A:
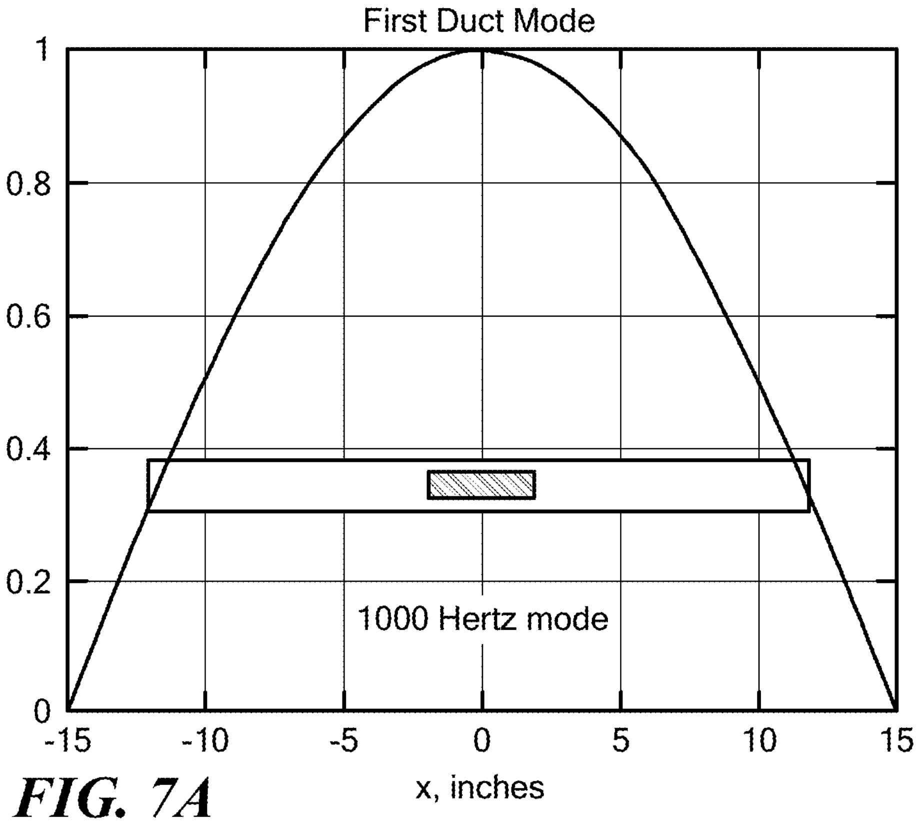
FIG. 7A shows a first duct mode and FIG. 7B shows a second duct mode for example wavelengths.
Figure 7B:
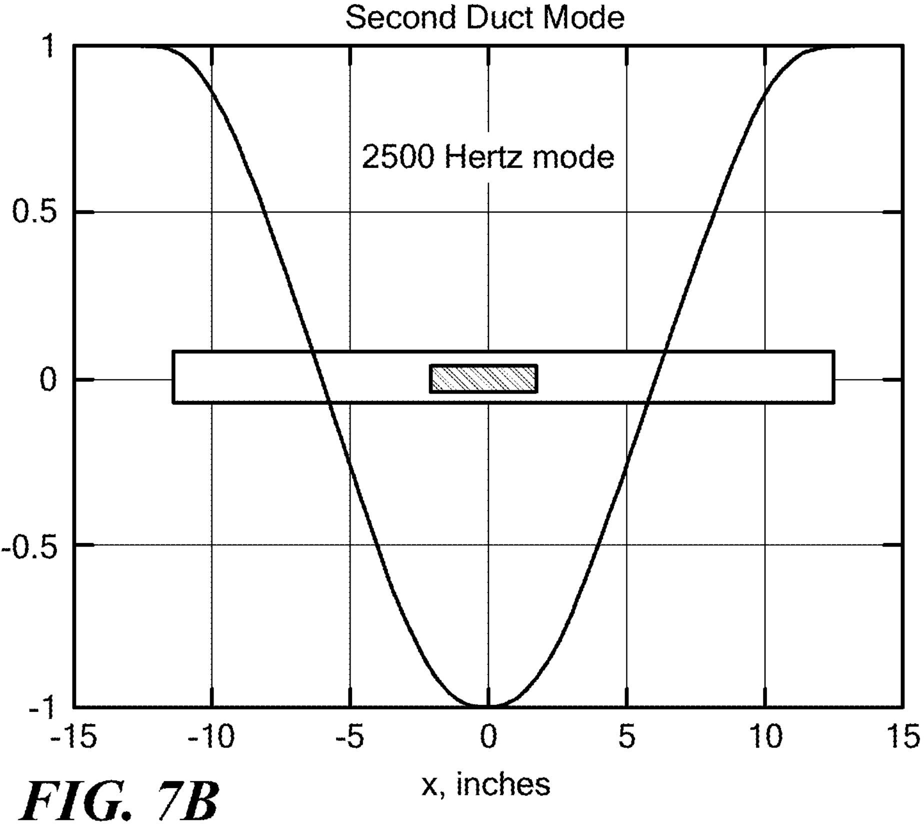

FIG. 7A shows a first duct mode at 1000 Hertz and FIG. 7B shows a second duct mode at 2500 Hertz. Assuming the iso-truss does not significantly alter the sound speed of water inside the truss, the wavelengths at 1000 and 2500 Hertz are $\lambda=c/f=5$ feet at 1000 Hertz and 2 feet at 2500 Hertz. The mode responses are shown at the corresponding wave lengths which almost fit inside the truss. In the first duct mode, the pressure associated with the acoustic mode is in phase with respect to the incident wave pressure thereby increasing the net pressure at the sensor (maximum RVS @1000 Hz). In the second duct mode, the pressure associated with the acoustic mode is out of phase with respect to the incident wave pressure thereby significantly decreasing the net pressure at the sensor (minimum RVS @2500 Hz).

Figure 8:
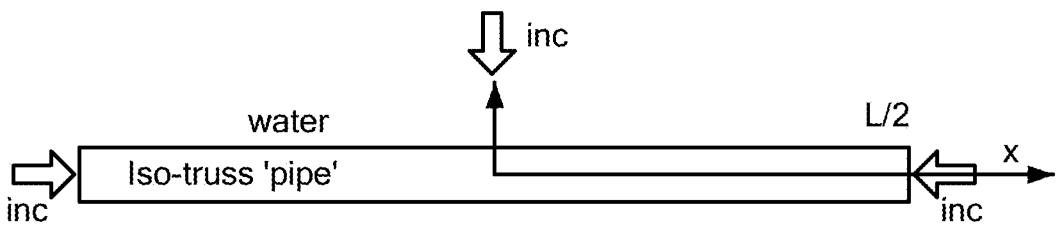
FIG. 8 shows a first order analytical model for an example sensor.

FIG. 8 shows a first order analytical model for an example sensor. The pressure at the sensor location (0) includes direct pressure from the incident wave since the iso-truss contains many open areas and a secondary pressure from highly damped acoustic modes inside the iso-truss. The pressure normalized to the incident pressure can be approximated by $$\frac{p}{P_{inc}} = 1 + \frac{1}{\cos\left(\frac{kL}{2}\right)}$$

where $$k = \frac{\omega}{c},$$

where the speed of the wave $c \approx c_{water}\sqrt{1+in_{rad}}$ where $n_{rad}$=radiation damping associated with sound passing through the openings in the iso-truss.

Figure 9:
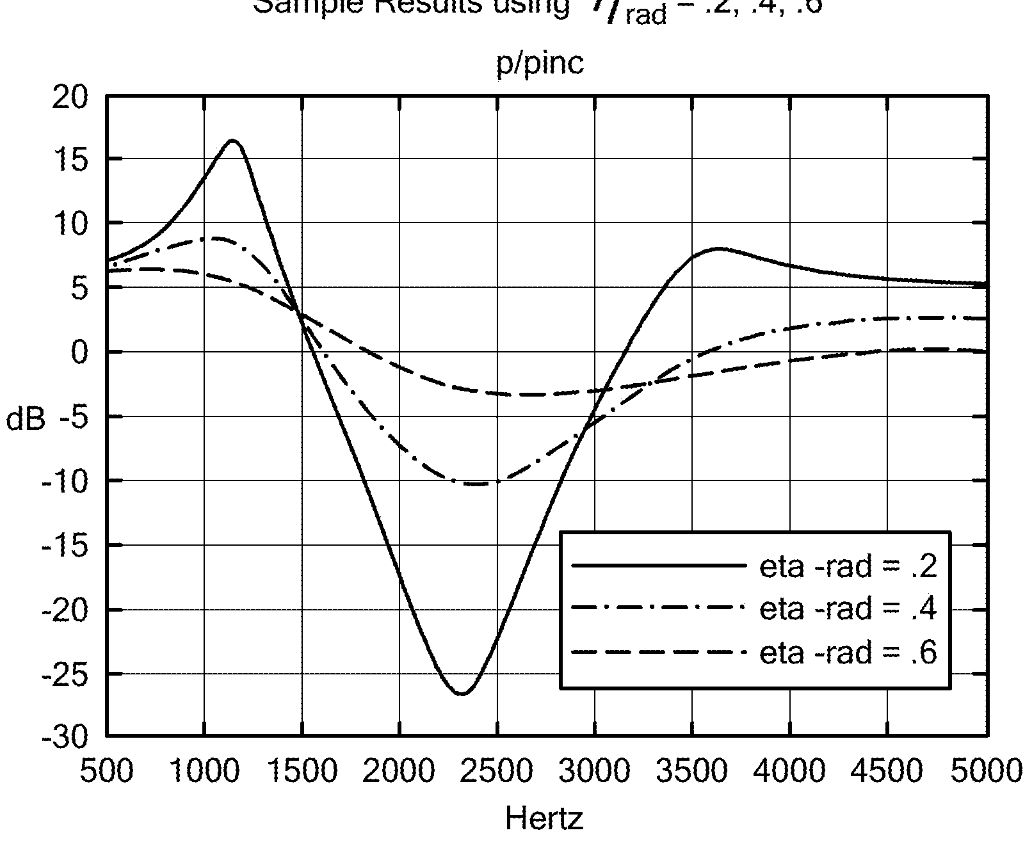
FIG. 9 shows sample results for an example sensor.

FIG. 9 shows sample results for an example sensor using $n_{rad}$=0.2, 0.4, 0.6. As can be seen, there is a peak around 1000 Hertz and a minimum around 2400 Hertz.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An acoustic system, comprising:

at least one isometric mesh tube having a plurality of openings through which an acoustic wave travels to increase sensitivity of the acoustic system; and at least one hydrophone configured to be suspended and held within the at least one isometric mesh tube without introducing a structural destructive interference, wherein the at least one hydrophone is encapsulated in a material that is impervious to a fluid in which the hydrophone is immersed.

2. The acoustic system of claim 1, wherein a plurality of hydrophones are suspended at intervals along the length of and within the at least one isometric mesh tube.

3. The acoustic system of claim 2, wherein all of the plurality of hydrophones are suspended at intervals along the length of and in the at least one isometric mesh tube to hold the hydrophones without introducing structural destructive interference.

4. The acoustic system of claim 1, wherein all of said at least one hydrophone is suspended in the isometric mesh tube to hold the hydrophones without introducing structural destructive interference.

5. The acoustic system of claim 1, wherein the at least one isometric mesh tube comprises at least one tapered isometric mesh tube.

6. The acoustic system of claim 1, wherein the at least one hydrophone is suspended and held in but not attached to the isometric mesh tube with a gap between the encapsulated hydrophone and the isometric mesh tube.

7. The acoustic of claim 1, wherein the at least one isometric mesh tube comprises a composite material, a metal, and/or a plastic.

8. The acoustic system of claim 1, wherein the encapsulation material of the at least one hydrophone comprises polyurethane.

9. The acoustic system of claim 1, wherein the at least one hydrophone comprises at least one piezoelectric device.

10. A method of fabricating an acoustic system, comprising:

inserting at least one hydrophone in at least one isometric mesh tube to hold the at least one hydrophone without introducing a structural destructive interference, said at least one isometric mesh having a plurality of openings through which an acoustic wave travels to increase sensitivity of the at least one hydrophone;

inserting the at least one isometric mesh tube into a fluid; and receiving the acoustic wave through the fluid by the at least one hydrophone.

11. The method of claim 10, further comprising inserting a plurality of hydrophones at intervals along the length of and in the at least one isometric mesh tube.

12. The method of claim 11, wherein all of the hydrophones are suspended at intervals along the length of and in the at least one isometric mesh tube to hold the hydrophones without introducing structural destructive interference.

13. The method of claim 10, wherein all of said at least one hydrophone is suspended in the isometric mesh tube to hold the hydrophones without introducing structural destructive interference.

14. The method of claim 10, wherein the at least one hydrophone is suspended and held within but not attached to the isometric mesh tube with a gap between the encapsulated hydrophone and the isometric mesh tube.

15. The method of claim 10, wherein the at least one isometric mesh tube comprises at least one tapered isometric mesh tube.

16. The method of claim 10, further comprising:

encapsulating the at least one hydrophone in a material that is impervious to the fluid in which the hydrophone is immersed.

17. The method of claim 16, wherein the encapsulation material of the at least one hydrophone comprises polyurethane.

18. An acoustic system, comprising:

a tube oriented along a z-axis;

a plurality of isometric mesh tubes coupled to the tube and foldable between a stored state along the z-axis and a deployed state in an xy plane;

each said isometric mesh tube having a plurality of openings through which an acoustic wave travels to increase sensitivity of the acoustic system;

at least one hydrophone configured to be suspended and held within each isometric mesh tube without introducing a structural destructive interference, wherein the at least one hydrophone is encapsulated in a material that is impervious to a fluid in which the hydrophone is immersed.

19. The acoustic system of claim 18, wherein all of said at least one hydrophone is suspended in the isometric mesh tube to hold the hydrophones without introducing structural destructive interference.

20. The acoustic system of claim 18, where the at least one hydrophone includes a plurality of hydrophones suspended at intervals along the length of and within in the at least one isometric mesh tube.

21. The acoustic system of claim 20, wherein all of the plurality of hydrophones are suspended within the isometric mesh tube to hold the hydrophones without introducing structural destructive interference.

22. The acoustic system of claim 18, wherein the at least one hydrophone is suspended and held within but not attached to the isometric mesh tube with a gap between the encapsulated hydrophone and the isometric mesh tube.

* * * * *